Sept. 28, 1943.  C. J. SMITH  2,330,389
SMOKING PIPE
Filed Oct. 22, 1941

Inventor
Charles J. Smith
By Clarence A. O'Brien
Attorney

Patented Sept. 28, 1943

2,330,389

UNITED STATES PATENT OFFICE 2,330,389

SMOKING PIPE

Charles J. Smith, Schenectady, N. Y.

Application October 22, 1941, Serial No. 416,099

1 Claim. (Cl. 131—217)

My invention relates to an improved smoking pipe especially designed for cool smoking, and the primary object of my invention is to provide an arrangement of this character which is of simple and inexpensive construction, and wherein the tobacco bowl and the smoke tube may be easily and inexpensively replaced when contaminated or obstructed.

Other important objects and advantages of my invention will be apparent from a reading of the following description taken in connection with the appended drawing, wherein for purposes of illustration I have shown a preferred embodiment of my invention.

Figure 1:
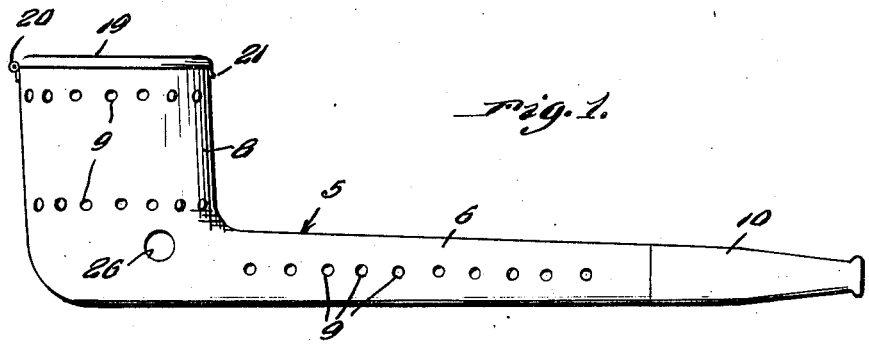
Figure 1 is a general side elevational view of the embodiment.
Figure 2:
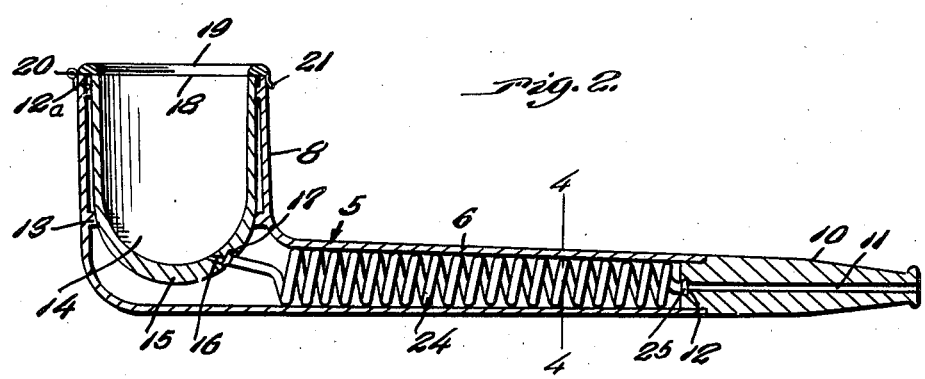
Figure 2 is a longitudinal vertical sectional view taken through Figure 1.
Figure 3:
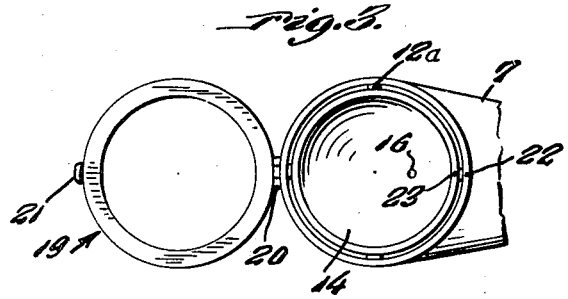
Figure 3 is a fragmentary top plan view of Figure 1 showing the removable bowl retainer in open position.
Figure 4:
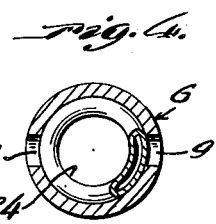
Figure 4 is an enlarged transverse vertical sectional view taken through Figure 2 along the line 4—4.

Referring in detail to the drawing, the present smoking pipe consists of a tubular body which is generally designated by the numeral 5 which is preferably although not necessarily of metal, and which is formed to provide an outwardly tapering stem 6 terminating at its inward end in a flattened and laterally widened flaring portion 7 which flares to the width of the bottom of the bowl containing portion 8 which is substantially cylindrical in form. The side walls of the stem 6 and the side walls of the bowl containing portion 8 are provided with holes 9 which admit air and cooperate in the production of currents of air through the body 5 for cooling purposes.

The outer or smaller end of the tubular stem 6 has a bit 10 plugged therein, the bit having a longitudinal smoke passage 11 terminating in a small enlargement 12 at its inner end.

The bowl containing portion 8 has upper and lower sets 12a and 13 of circumferentially spaced interior lugs to mount the replaceable bowl 14 which is slightly downwardly tapered and has preferably a rounded bottom 15 formed in one side with a smoke passage 16 which has an enlarged portion 17. The downward taper of the bowl 14 and corresponding proportioning of the sets of lugs 12a and 13 allows the bowl to removably seat in place in the bowl containing portion 8 with its upper edge 18 substantially flush with the upper edge of the bowl containing portion 8. An annular retainer 19 is hinged as indicated by the numeral 20 at one side of the upper edge of the bowl containing portion 8, the retainer having a flat undersurface to retainably engage the upper edge 18 of the bowl. The top surface of the retainer 19 is rounded for appearance. A spring detent 21 on the free edge of the retainer 19 is adapted to frictionally engage the exterior of the bowl containing portion 8 to hold the retainer in place. The upper edge of the bowl containing portion 8 and the upper edge of the bowl 14 have corresponding marks 22 and 23, which when aligned put the smoke passage 16 in the bottom of the bowl in the proper position for receiving the flared terminal of the helical smoke cooling pipe 24, whose convolutions or coils may extend substantially the length of the tubular stem 6. The smoke pipe coil may be tapered to substantially exactly fit the tapering interior of the tubular stem 6. The outer end of the smoke cooling tube 24 has a flaring terminal 25 which seats in the enlarged portion 12 of the bore 11 of the bit 10. While the smoke cooling pipe 24 is preferably of metal, it can be made of any suitable material, with a view to inexpensiveness. In any case, however, the construction of the pipe 24 is to be such as to require it to be longitudinally compressed when put in place, so that the resultant tension keeps the terminals of the pipe adequately seated in the smoke passages of the bowl 14 and bit 10. It is obvious that the smoke cooling pipe may be easily removed and replaced simply by removing the bit 10. An enlarged hole 26 in the side of the bowl containing portion 8 of the pipe is provided to enable viewing the operation of placing the terminal of the smoke tube 24 in the smoke passage 16 of the bowl when assembling the pipe.

It is believed obvious that the tortuous passage provided by the smoke pipe 24, the same being cooled by radiation from its many coils, and the provision of the holes 9 for circulating air through the stem 6 and the bowl retaining portion 8, will greatly reduce the temperature of the smoke on its way from the bowl 14 to the bit 10 so that the smoke arrives cool to the mouth of the smoker. It is also to be observed that the rate of cooling is accelerated by the natural air currents in the bowl containing portion and the stem 6 due to the difference in temperature of the different parts of the pipe.

Although I have shown and described herein a preferred embodiment of my invention, it is to be definitely understood that I do not wish to limit the application of my invention thereto, except as may be required by the scope of the subjoined claim.

Having described the invention, what is claimed as new is:

A smoking pipe comprising a tubular relatively thin walled body, said body being formed to provide an elongated stem and a bowl receptacle of substantially cylindrical shape, a bit plugged into the outer end of said stem, a removable bowl seated in said bowl receptacle, interior projections in said receptacle supporting the bowl in spaced relation to the walls of said receptacle, and a smoke cooling pipe extending through said stem and connecting the inner end of said bit and the lower part of said bowl, said smoke cooling pipe comprising a helical coil tube having one end inserted in the bore of the bit and its opposite end inserted in an opening formed in the bowl, said coil being substantially overlength so as to be longitudinally compressed and tensioned between the bowl and the bit by insertion of the bit in the outer end of the stem.

CHARLES J. SMITH.